(12) United States Patent
Chou et al.

(10) Patent No.: US 7,591,563 B2
(45) Date of Patent: Sep. 22, 2009

(54) BACKLIGHT DEVICE FOR DISPLAY SYSTEM PROVIDING ENHANCED PERIPHERAL ILLUMINATION

(75) Inventors: Shen-Hong Chou, Kaohsiung (TW); Yi-Chun Lin, Hsinchu (TW)

(73) Assignee: AU Optronics Corporation, Hsinchu (TW)

( * ) Notice: Subject to any disclaimer, the term of this patent is extended or adjusted under 35 U.S.C. 154(b) by 698 days.

(21) Appl. No.: 10/758,364

(22) Filed: Jan. 15, 2004

(65) Prior Publication Data

US 2005/0174318 A1    Aug. 11, 2005

(51) Int. Cl.
    *G02F 1/13357*    (2006.01)
(52) U.S. Cl. .................. 362/97.3; 362/613; 362/631; 362/632; 362/222; 362/800
(58) Field of Classification Search ............. 362/613, 362/608, 621, 632–634, 800, 217, 222, 223, 362/235, 236, 240, 246, 248, 631, 217.1, 362/217.11, 362, 29, 30, 97.1–97.3; 349/66
    See application file for complete search history.

(56) References Cited

U.S. PATENT DOCUMENTS

| 5,709,463 | A | | 1/1998 | Igram |
| 6,007,209 | A | * | 12/1999 | Pelka ........................... 362/30 |
| 6,126,297 | A | | 10/2000 | Matsui et al. |
| 6,164,789 | A | | 12/2000 | Unger et al. |
| 6,315,440 | B1 | * | 11/2001 | Satoh ........................... 362/561 |
| 6,419,372 | B1 | * | 7/2002 | Shaw et al. .................. 362/231 |
| 6,616,316 | B2 | * | 9/2003 | Takayanagi et al. ......... 362/561 |
| 6,923,548 | B2 | * | 8/2005 | Lim ............................. 362/612 |
| 6,964,497 | B2 | * | 11/2005 | Greiner ....................... 362/241 |
| 6,969,189 | B2 | * | 11/2005 | Lee et al. ..................... 362/631 |
| 7,036,946 | B1 | * | 5/2006 | Mosier ......................... 362/27 |
| 7,052,152 | B2 | * | 5/2006 | Harbers et al. ............... 362/30 |
| 7,063,430 | B2 | * | 6/2006 | Greiner ....................... 362/30 |
| 2004/0070966 | A1 | * | 4/2004 | Ahn et al. ..................... 362/31 |
| 2004/0151006 | A1 | * | 8/2004 | Yang ........................... 362/558 |
| 2004/0174706 | A1 | * | 9/2004 | Kan ............................ 362/241 |
| 2005/0002205 | A1 | * | 1/2005 | Yu et al. ...................... 362/555 |

FOREIGN PATENT DOCUMENTS

| JP | 11084377 | 3/1999 |
| JP | 11-344707 | 12/1999 |
| JP | 2000514949 T | 11/2000 |
| JP | 2002-015611 | 1/2002 |
| JP | 2003-223805 | 8/2003 |
| JP | 2003331604 | 11/2003 |

* cited by examiner

*Primary Examiner*—Jong-Suk (James) Lee
*Assistant Examiner*—Leah S Lovell
(74) *Attorney, Agent, or Firm*—Baker & McKenzie LLP (57) ABSTRACT

The present application describes a backlight device for providing enhanced peripheral illumination of light modulators in display systems. In one embodiment, a display system includes a light modulator, a light diffusing plate, and a backlight device. The backlight device includes light sources that are distributed over an area that is at least equal to or greater than an image display area of the light modulator. In another embodiment, an edge-lit type backlight device is described. The edge-lit type backlight device includes a light guide plate for directing light towards the light modulator. The edge-lit type backlight device further includes light sources that are distributed along a side edge of the light guide plate. The light sources are distributed along a length that is at least equal to or greater than a corresponding length of an image display area of the light modulator.

8 Claims, 11 Drawing Sheets

BACKLIGHT DEVICE FOR DISPLAY SYSTEM PROVIDING ENHANCED PERIPHERAL ILLUMINATION

FIELD OF THE INVENTION

The present invention generally relates to backlight devices for display systems, and more particularly, to a backlight device that can improve the illumination of peripheral display areas of a display panel.

DESCRIPTION OF THE RELATED ART

Figure 1:
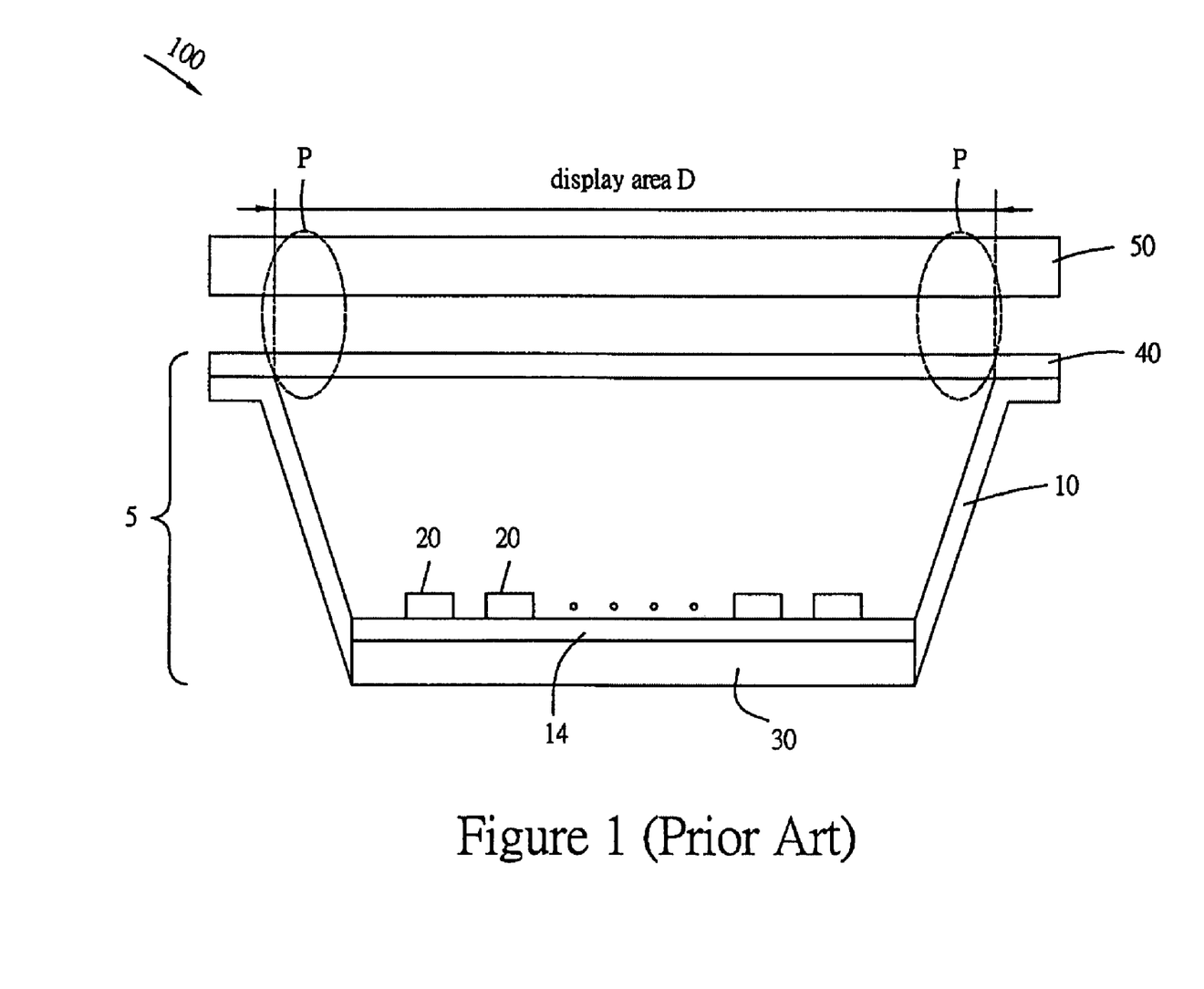
FIG. 1 illustrates a schematic view of a conventional display system, which uses a backlight source for illuminating a display area of a light modulator.

FIG. 1 illustrates a schematic view of a conventional display system 100. The display system 100 includes a backlight source 5 and a light modulator 50. The light modulator 50 includes an image display area 'D.' The backlight source 5 illuminates the display area 'D' in the light modulator 50. Typically, the light modulator 50 is a liquid crystal display. The backlight source 5 includes a case 10, which encloses light sources 20 that are distributed over a circuit board 30. The light source 20 can be any light emitting source such as a light emitting diode (LED). The circuit board 30 is configured to provide appropriate driving power to the light source 20. The backlight source 5 further includes a reflective sheet 14 interposed between the light sources 20 and the circuit board 30 and a light-diffusing plate 40 mounted on the case 10 for diffusing light on the light modulator 50.

Typically, peripheral regions 'P' of the light-diffusing plate 40 and the display area 'D' of the light modulator 50 do not receive a sufficient amount of light from the light sources 20, which results in a relatively darker image display in the peripheral regions 'P' of the display area 'D' compared to the rest of the display area. Further, in color display systems, when the light sources 20 emit light of different wavelengths, the peripheral regions 'P' do not receive adequate light of each color from the light sources 20, which results in color deviation in a displayed image at the peripheral regions 'P' of the display area 'D.' Therefore, there is a need in the art for an improved backlight source that can overcome the foregoing problems and provide a better peripheral illumination for light modulators in display systems.

SUMMARY OF THE INVENTION

The present application describes a backlight device that provides enhanced peripheral illumination of light modulators in display systems. In one embodiment, the backlight device includes a light-diffusing plate corresponding to a light modulator in a display system. The light-diffusing plate is configured to direct light towards the light modulator. The backlight device further includes light sources that are distributed over an area that is at least equal to or greater than an image display area of the light modulator. In some embodiments, when the image display area of the light modulator has a width 'A' and a length 'B' and each one of the light sources is separated from adjacent light sources by a pitch 'G,' a surface area 'S' occupied by the light sources is given as: $(A+G) \times (B+G) \leq S \leq (A+3G) \times (B+3G)$.

In another embodiment, an edge-lit type backlight device is described. The edge-lit type backlight device includes a light guide plate for directing light towards the light modulator. The edge-lit type backlight device further includes light sources that are distributed along a side edge of the light guide plate. The length of the side edge of the light guide plate corresponds to a length of an image display area of the light modulator. The light sources are distributed along a length 'M' that is at least equal to or greater than the corresponding length of the image display area of the light modulator. In some variations, if the corresponding length of the image display area is given as 'B' and each one of the light sources is separated from adjacent light sources by a pitch 'G,' then the length 'M' is given as: $(B+G) \leq M \leq (B+3G)$.

In some embodiments, backlight devices include a device case that encloses the light sources. The device case includes sidewalls with an inner surface and an outer surface. In some variations, portions of sidewalls can be inclined at an angle in the range of about 60 degrees to about 90 degrees relative to the plane of the light sources.

The foregoing is a summary and shall not be construed to limit the scope of the claims. The operations and structures disclosed herein may be implemented in a number of ways, and such changes and modifications may be made without departing from this invention and its broader aspects. Other aspects, inventive features, and advantages of the invention, as defined solely by the claims, are described in the non-limiting detailed description set forth below.

DETAILED DESCRIPTION OF THE EMBODIMENT(S)

Figure 2A:
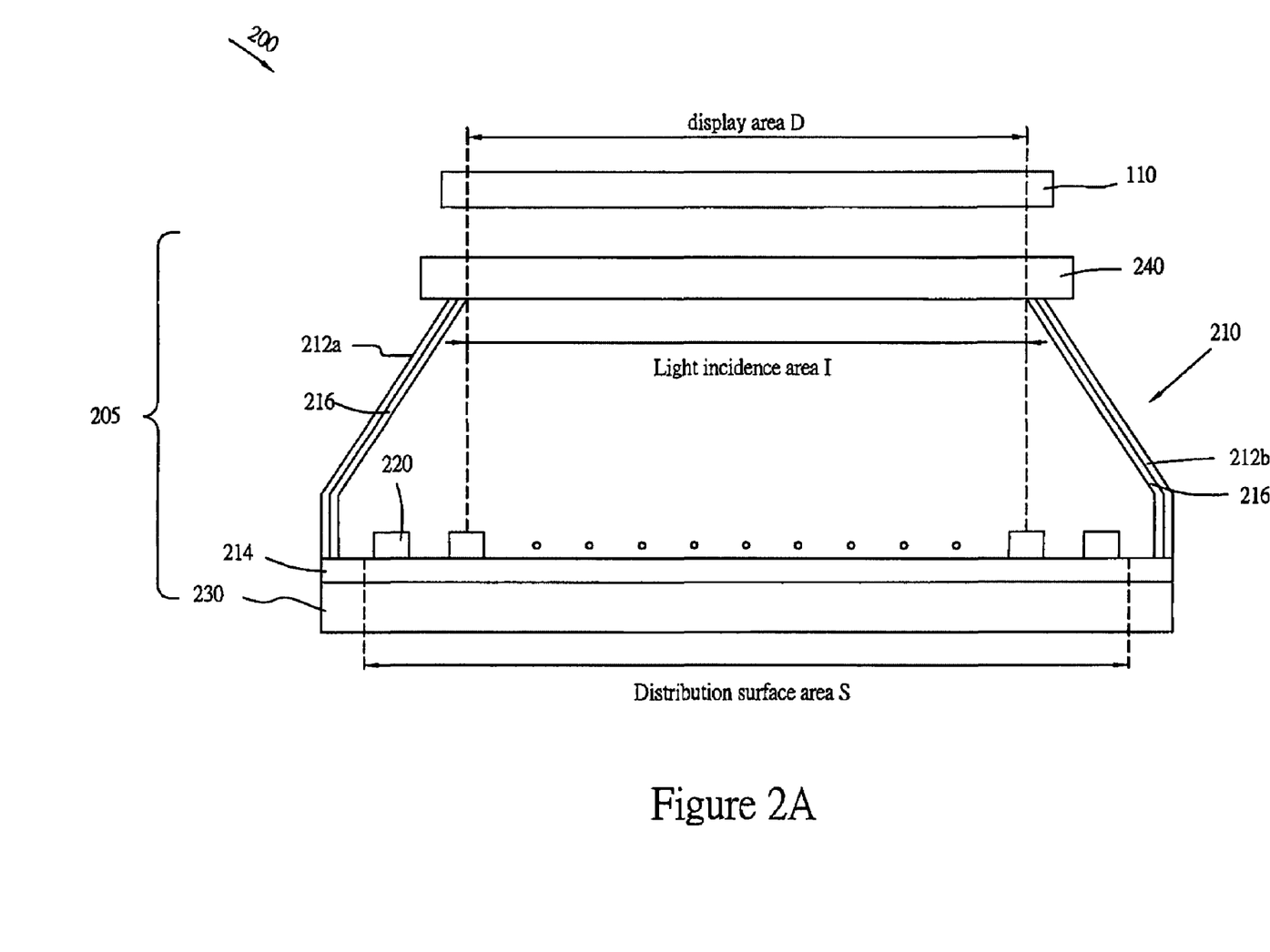
FIG. 2A is a schematic view of an exemplary display system including an exemplary backlight device used for illuminating a display area of a light modulator.

FIG. 2A is a schematic view of an exemplary display system 200. The display system 200 includes a backlight source 205 and a light modulator 110. The light modulator 110 includes a display area 'D' for displaying images. The backlight source 205 includes a case 210, which encloses light sources 220 mounted on a circuit board 230. In the present example, the backlight source 205 is a direct type backlight source in which the light sources 220 directly irradiate the light modulator 110. The light sources 220 can be any light sources such as light emitting diodes. The light sources 220 can include light emitting diodes of any color. Light of different wavelengths emitted from the light source 220 can be combined to obtain a wide range of color display on the light modulator 110. Further, the light emitting diodes can be of a single chromaticity for example, white-color light emitting diodes. The white-color light emitting diodes can be used with color filters to obtain a color display.

The light modulator 110 can be any light modulator configured to display images such as a liquid crystal display panel. The circuit board 230 includes circuitry required to provide driving power to the light sources 220. A reflective sheet 214 can be placed between the light sources 220 and the circuit board 230 to direct light emitted from the light sources 220 toward the light modulator 110. A light diffusing plate 240 is coupled to the case 210 for directing light towards the light modulator 110. The case 210 can include a reflective coating 216 on the inner side of sidewalls 212a and 212b to reflect light emitted from the light sources 220.

The light sources 220 are distributed in an array over a surface area 'S' of the circuit board 230 at the base of the case 210 and irradiate a light incidence area 'I' of the light-diffusing plate 240. The diffused light then emerges out of the light-diffusing plate 240 and illuminates a display area 'D' of the light modulator 110. According to one embodiment, the light incidence area 'I' is approximately equal to the display area 'D' of the light modulator 110 and the surface area 'S' occupied by the light sources 220 is at least approximately equal to or greater than the display area 'D' of the light modulator 110. Thus, a ratio of the display area 'D' to the surface area 'S' can be expressed as: $D/S \leq 1$. When the light incidence area 'I' is approximately equal to the display area D, the ratio of the light incidence area 'I' to the surface area 'S' can be given as $I/S \leq 1$.

Figure 2B:
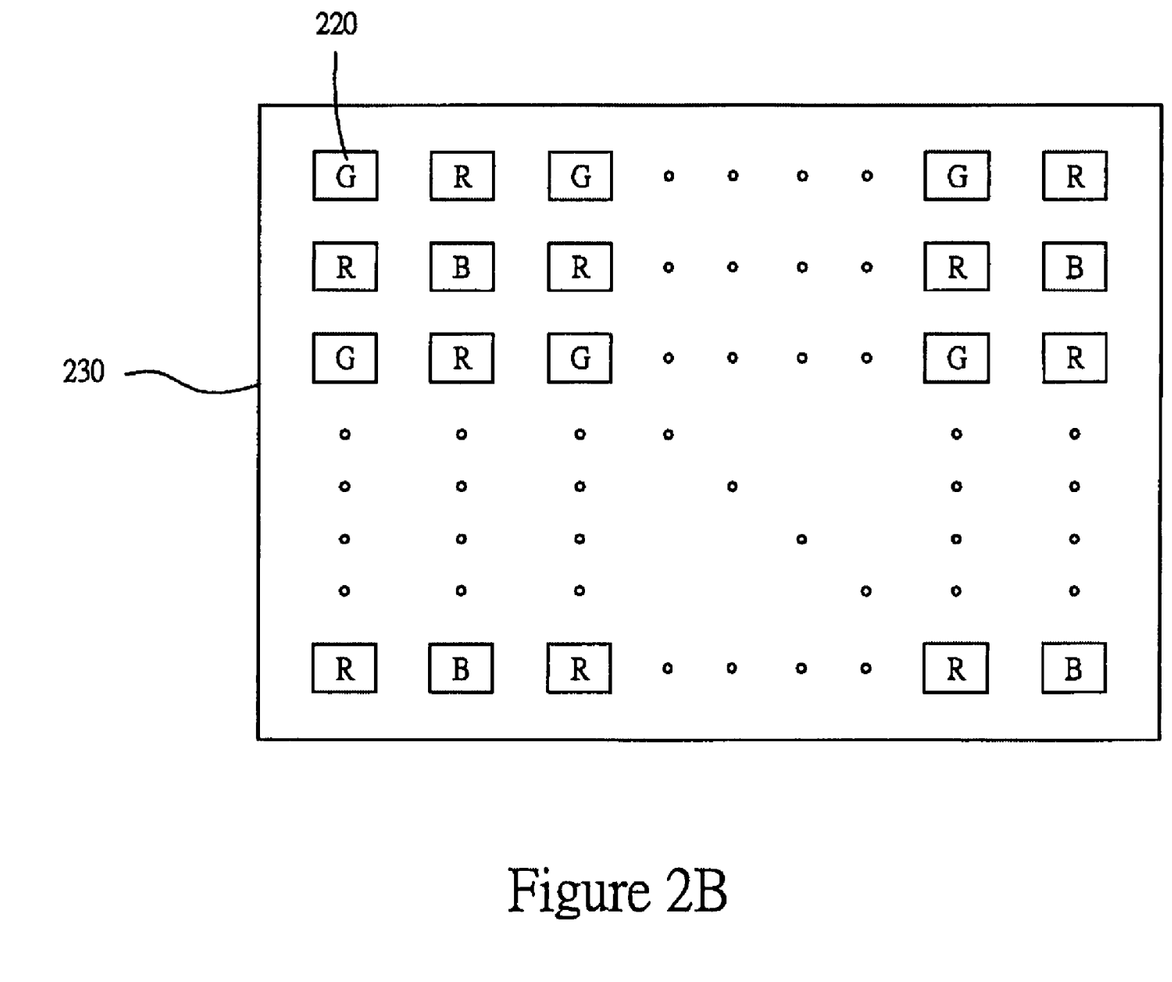
FIG. 2B illustrates an exemplary distribution of the light sources on a circuit board in a backlight device.

FIG. 2B illustrates an exemplary distribution of the light sources 220 on the circuit board 230. In the present example, the light sources 220 include light emitting diodes of red (R), green (G), and blue (B) colors; however, the light sources 220 can include any type of light sources configured to emit light of a desired color. Further, the light sources 220 can be place in any suitable arrangement on the circuit board 230; for example, the light sources 220 can be placed in a delta arrangement or the like.

Figure 2C:
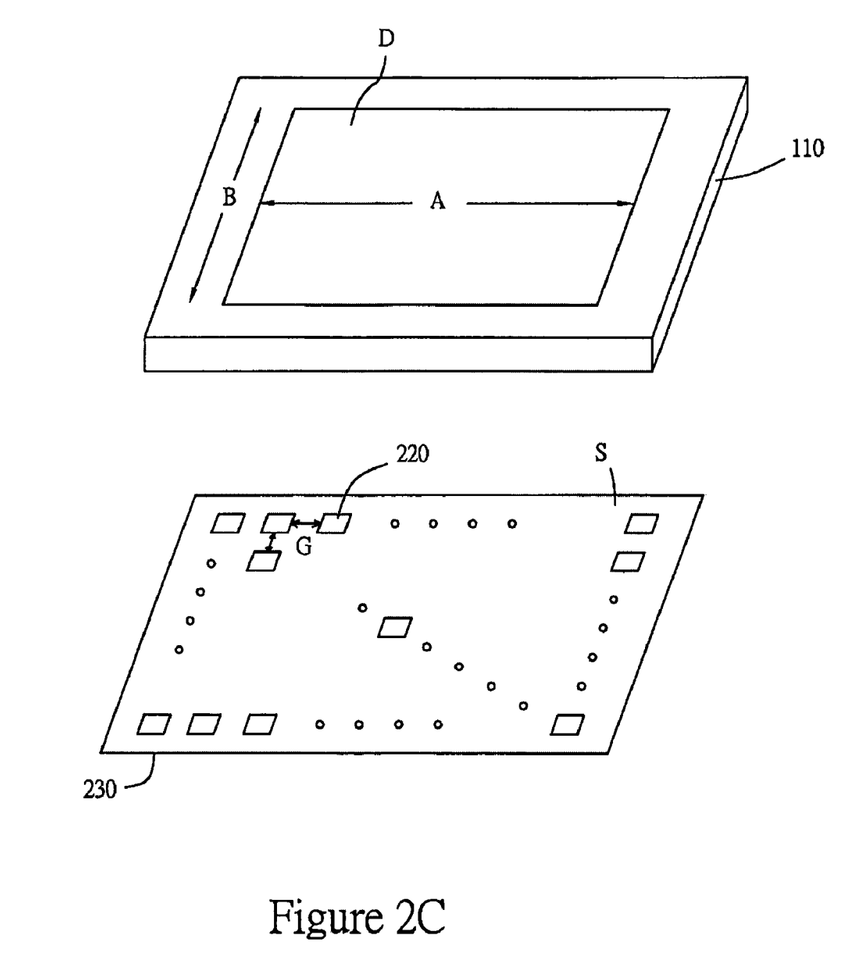
FIG. 2C shows an exemplary arrangement of light sources corresponding to a light modulator.

FIG. 2C shows an exemplary arrangement of light sources 220 corresponding to the light modulator 110. The display area 'D' of the light modulator 110 is defined by a width 'A' and a length 'B.' According to one embodiment, the surface area 'S' occupied by the light sources 220 on the circuit board 230 is configured as follows:

$$(A+G) \times (B+G) \leq S \leq (A+3G) \times (B+3G)$$

where 'G' is the distance between adjacent light sources 220. This exemplary configuration provides substantially uniform light intensity throughout the display area 'D,' and particularly, through the peripheral regions 'P' of the display area 'D.'

Figure 2D:
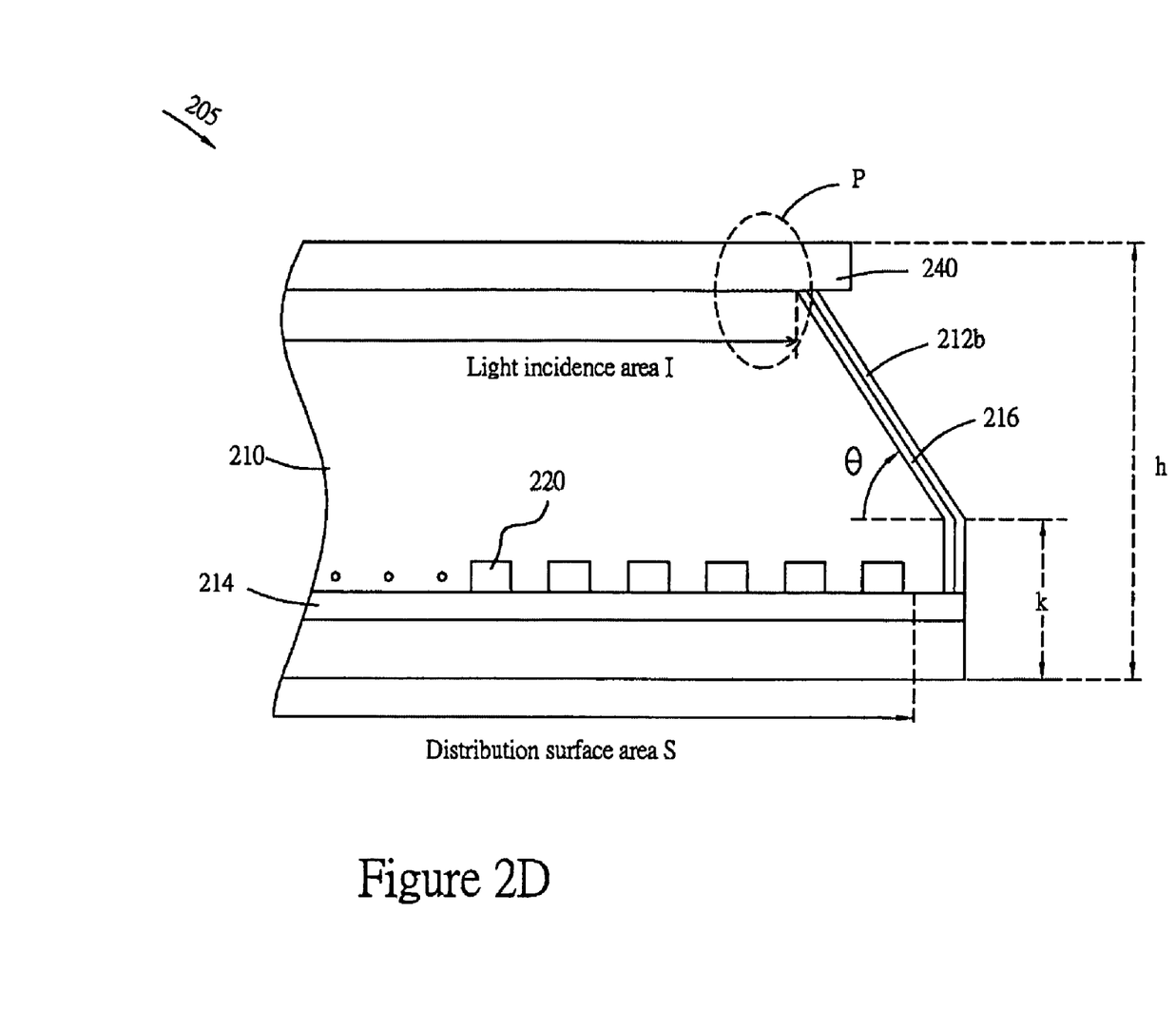
FIG. 2D illustrates an exemplary configuration of sidewalls of a device case in an exemplary backlight device.

FIG. 2D illustrates an exemplary configuration of the sidewalls 212a and 212b of the case 210 in the backlight source 205. In the present example, the height 'h' of the case 210 is about 4 cm and a portion of the sidewall 212b is inclined at an angle θ at a height 'k' from the base of the case 110. Similarly, the sidewall 212a can be inclined at the same or different angle and the same height or at a different height. According to one embodiment, the angle θ can be in the range of about 60° to about 90° for the case height 'h' of about 4 cm. The angle θ and the height 'k' can be adjusted according to the desired amount of light intensity required at the display area 'D.' The angle θ and the height 'k' can be adjusted according to various parameters of the display system 200 such as, for example, the size of the display area 'D,' the size of the surface area 'S,' the ratio I/D, the height 'h' of the case 210, the distance between adjacent light sources 220, and the like.

Figure 2E:
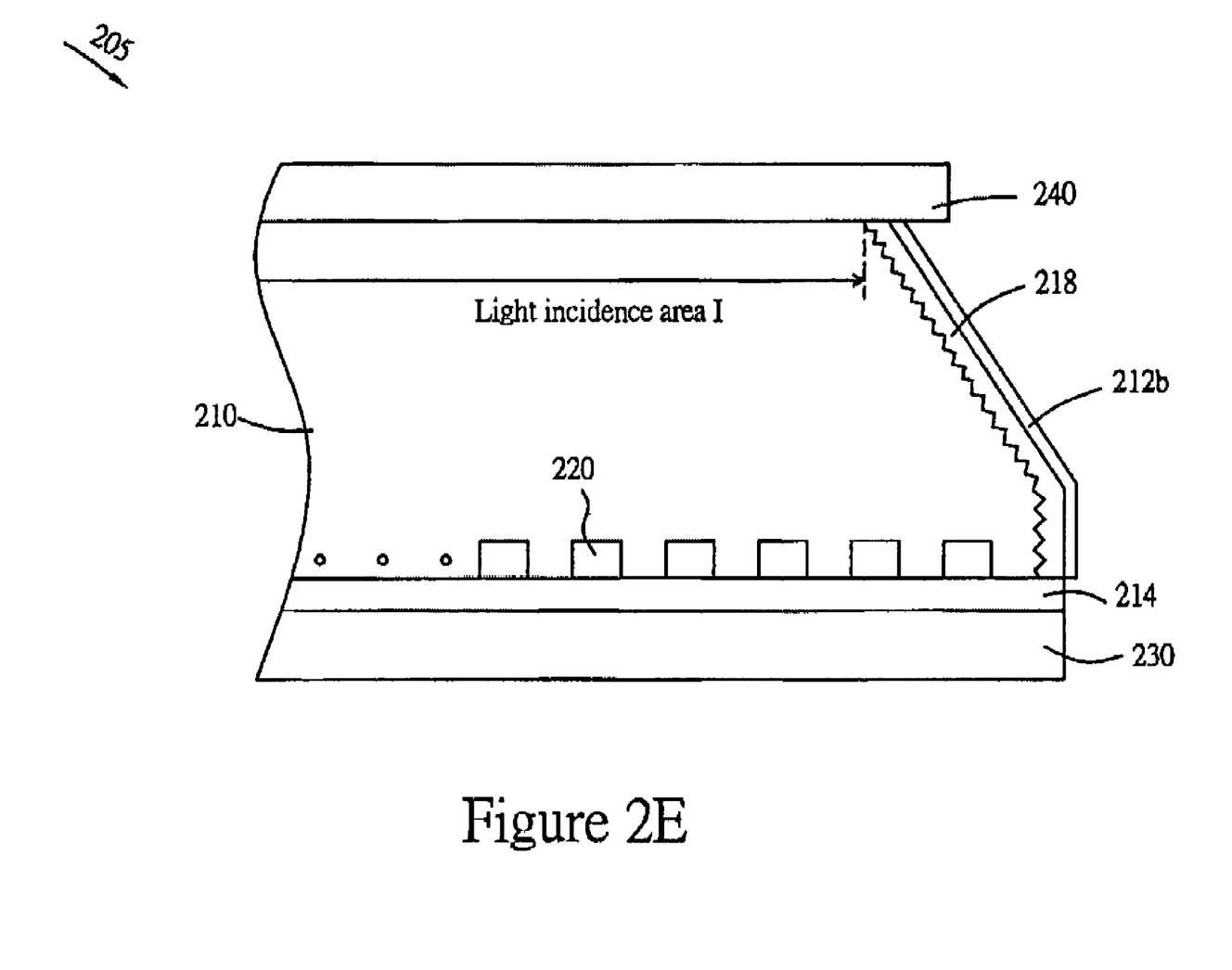
FIG. 2E illustrates another exemplary configuration of sidewalls of the device case.

FIG. 2E illustrates another exemplary configuration of the sidewalls 212a and 212b of the case 210. In this exemplary configuration, the inside surface of the sidewalls 212a and 212b can include edges 218. The edges 218 are configured to scatter light within the case 210 to further enhance the illumination of the light modulator 110.

Figure 2F:
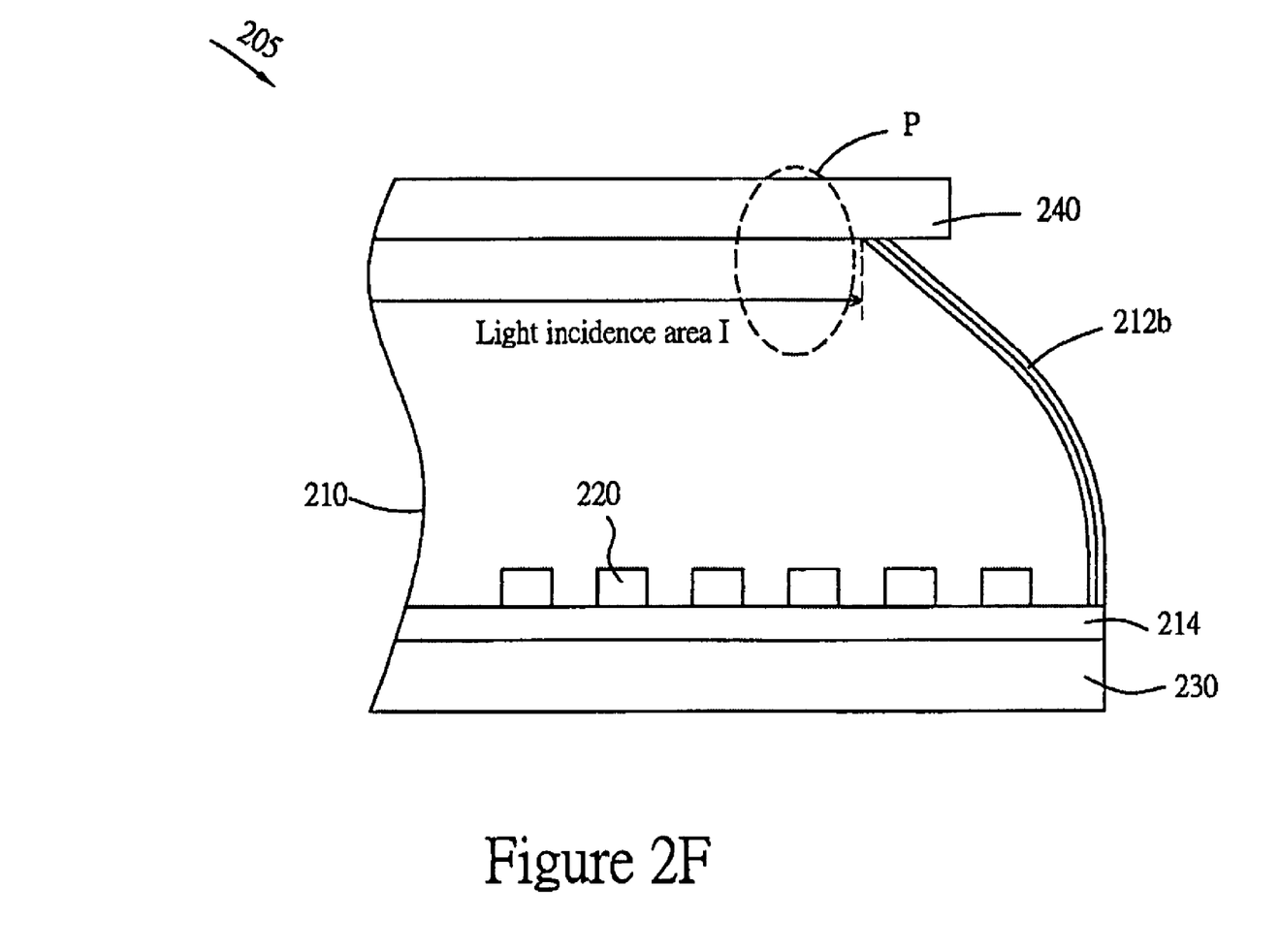
FIG. 2F illustrates yet another exemplary configuration of sidewalls of the device case.

FIG. 2F illustrates yet another exemplary configuration of the sidewalls 212a and 212b of the case 210. In this exemplary configuration, the sidewalls 212a and 212b are curved instead of being bent at an angle θ. Similarly, the sidewalls 212a and 212b can be configured using various profiles to optimize the light intensity throughout the display area 'D.'

Figure 3A:
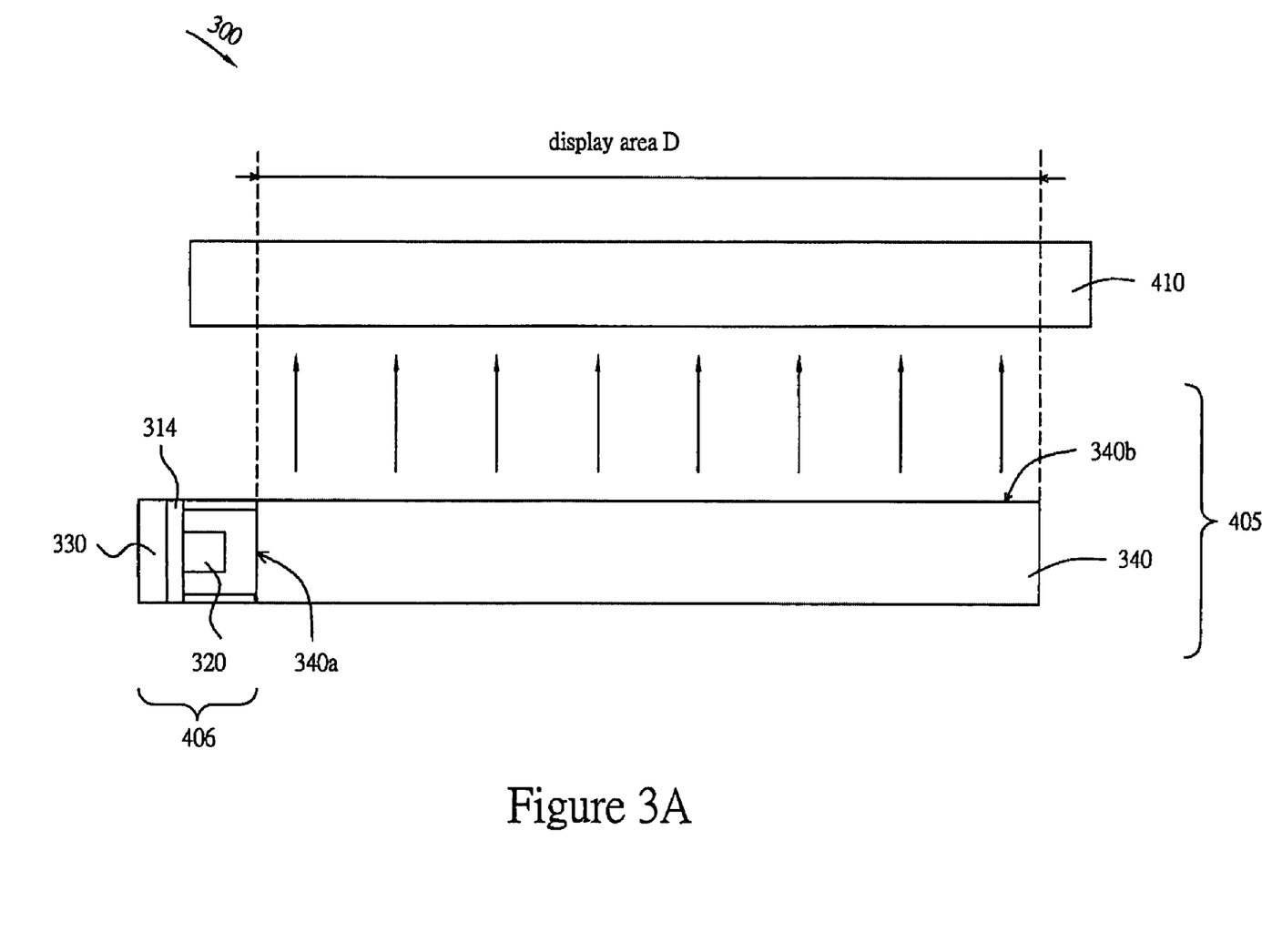
FIG. 3A shows a cross-sectional view of an exemplary display system including an edge-lit type backlight device.

FIG. 3A illustrate a cross-sectional view of an exemplary display system 300 including an edge-lit type backlight source 405 and a light modulator 410. The backlight 405 includes a light source module 406 and a light guide plate 340. The light source module 406 is placed at a side edge 340a of the light guide plate 340. When the light source module 406 is illuminated, light emitted from the light source module 406 enters the light guide plate from the side edge 340a and exits from a light-emerging surface 340b to impinge upon a display area 'D' of the light modulator 310. The light source module 406 includes light sources 320 mounted on a circuit board 330. A reflective shield 314 can be placed between the light sources 320 and the circuit board 330 to direct light towards the side edge 340a of the light guide plate 340. In the present example, the light sources 320 are light emitting diodes; however, other types of light emitting source such as a cold cathode fluorescent lamp can be used. Further, the light sources 320 can be placed at two or more side edges of the light guide plate 340.

Figure 3B:
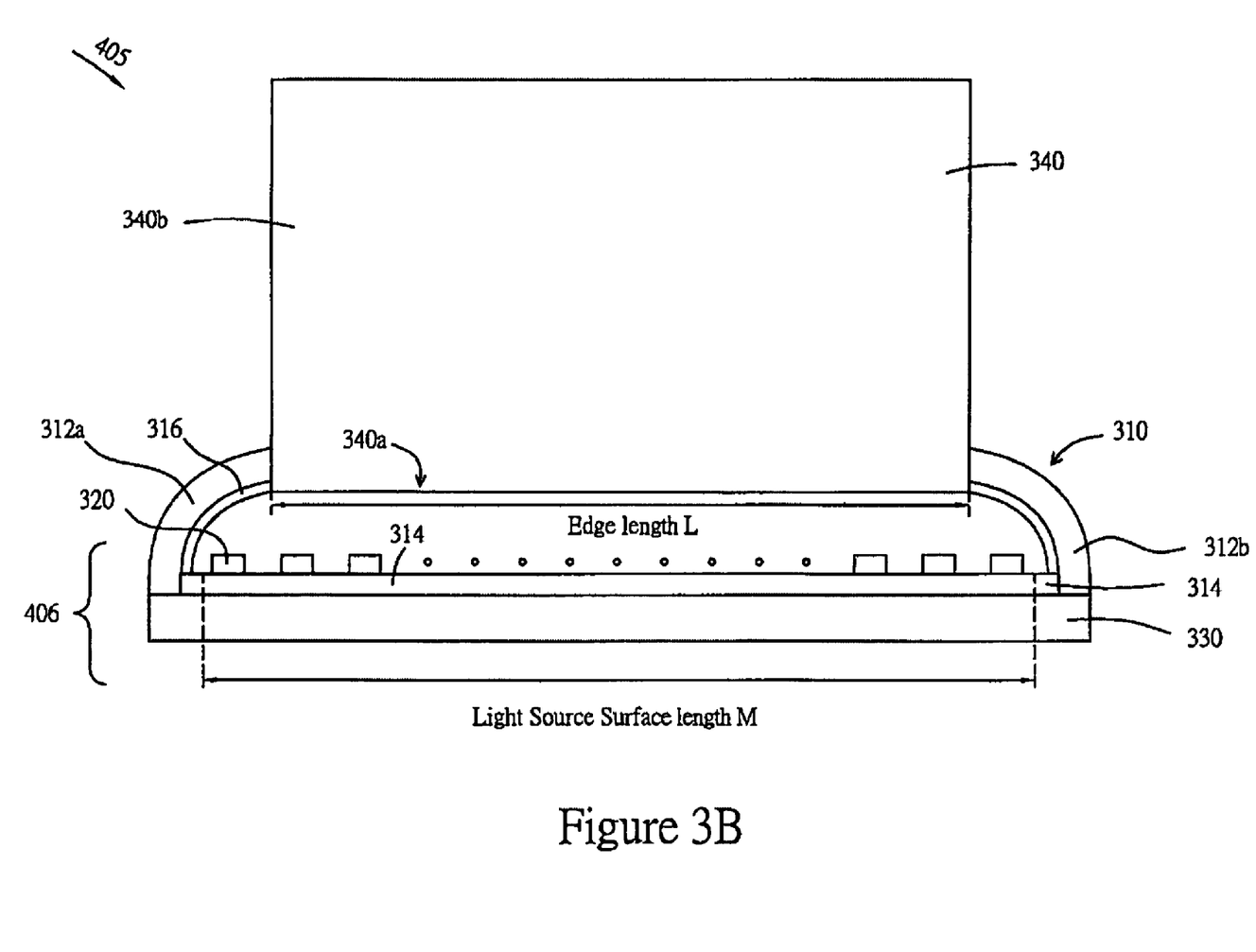
FIG. 3B illustrates an exemplary structure of the edge-lit type backlight device.

FIG. 3B illustrates an exemplary structure of the backlight 405. A case 310 encloses the light source module 406. The case 310 includes sidewalls 312a and 312b. In the present example, a reflective coating 316 is laid on the inner surface of sidewalls 312a and 312b. Light from the light sources 320 impinges upon the side edge 340a of the light guide plate 340 having an edge length 'L.' The light sources 320 are distributed along a length 'M' on a surface area 'S' of the circuit board 330.

Figure 3C:
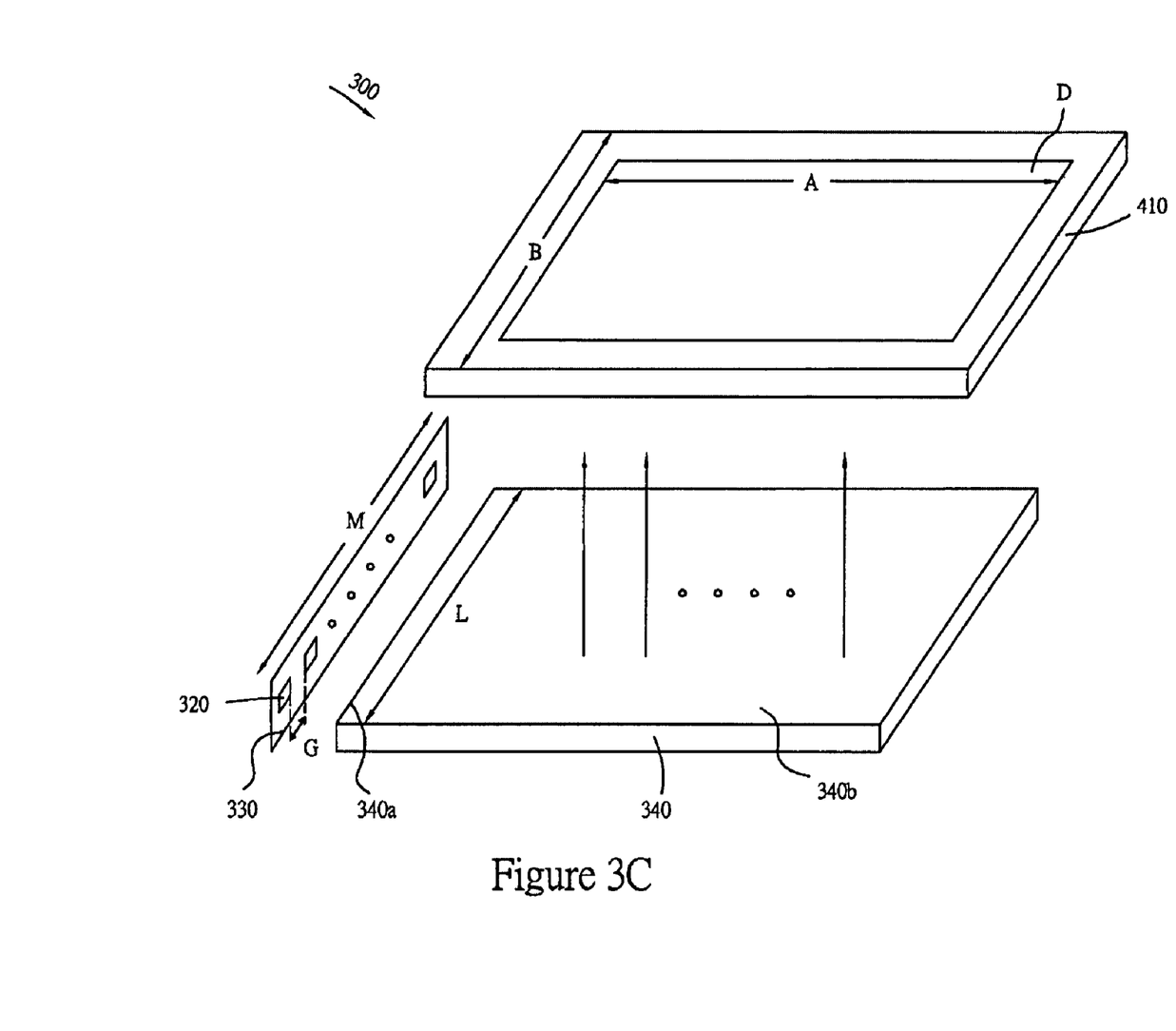
FIG. 3C shows an exemplary placement of various components in an exemplary display system.

FIG. 3C shows an exemplary placement of various components of the display system 300. The light from the light sources 320 enters into the light guide plate 340 from the side edge 340a and exits from the light-emerging surface 340b. The light-emerging surface 340b corresponds to the display area 'D' of the light modulator 410. The display area 'D' of the light modulator 110 is defined by a width 'A' and a length 'B.' The edge length 'L' of the light guide plate 340 corresponds to the length 'B' of the display area 'D' of the light modulator 410. In one embodiment, the length 'M' of the light sources 320 on the circuit board 330 is set to be approximately equal to or greater than the length 'B' of the display area 'D.' Thus, the ratio of the length 'B' to the length 'M' can be expressed as: $B/M \leq 1$.

When the length 'B' of the display area 'D' is approximately equal to the edge length 'L' of the edge surface 340a, the foregoing ratio can be further expressed as $L/M \leq 1$. According to one embodiment, the length 'M' of the light sources 320 on the circuit board 330 is selected according to the following relationship:

$$(B+G) \leq M \leq (B+3G)$$

where 'G' is the distance between light sources 320 on the circuit board 330 and 'B' is the length of the display area 'D.'

This exemplary configuration results in substantially uniform illumination of the display area 'D' of the light modulator 410 including the peripheral regions. In this embodiment, the brightness at the peripheral region of the display area 'D' drops to about less than 15% compared to other regions of the display area. In the prior art display systems, the brightness at the peripheral region drops to about 50%. Thus, the exemplary backlight configuration of the display system 300 substantially improves illumination at the periphery of the display area 'D.'

Figure 3D:
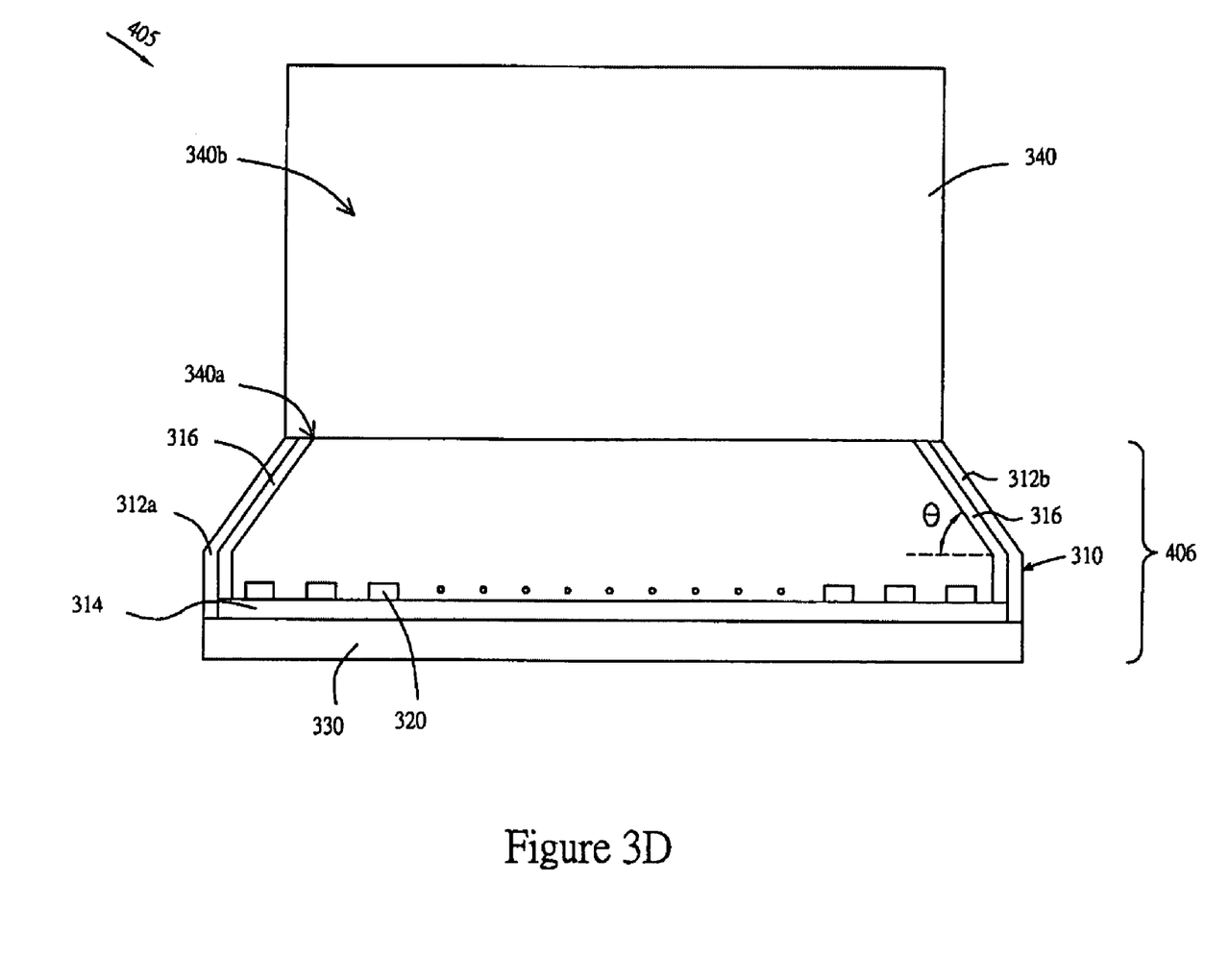
FIG. 3D illustrates an exemplary configuration of a device case for the edge-lit type backlight source.

FIG. 3D illustrates an exemplary configuration of the case 310 of the light source module 406. In the present example, portions of the sidewalls 312a and 312b are inclined at an angle θ; however, the sidewalls 312a and 312b can also be curved as shown in FIG. 2F.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

The section headings in this application are provided for consistency with the parts of an application suggested under 37 CFR 1.77 or otherwise to provide organizational cues. These headings shall not limit or characterize the invention(s) set out in any patent claims that may issue from this application. Specifically and by way of example, although the headings refer to a "Field of the Invention," the claims should not be limited by the language chosen under this heading to describe the so-called field of the invention. Further, a description of a technology in the "Description of Related Art" is not be construed as an admission that technology is prior art to the present application. Neither is the "Summary of the Invention" to be considered as a characterization of the invention(s) set forth in the claims to this application. Further, the reference in these headings to "Invention" in the singular should not be used to argue that there is a single point of novelty claimed in this application. Multiple inventions may be set forth according to the limitations of the multiple claims associated with this patent specification, and the claims accordingly define the invention(s) that are protected thereby. In all instances, the scope of the claims shall be considered on their own merits in light of the specification but should not be constrained by the headings included in this application.

What is claimed is:

1. A display device comprising:
   a display panel having a display area for displaying images;
   a backlight device coupled to the display panel, including:
      a circuit board;
      a plurality of light sources distributed on the circuit board with a light distribution surface area; and
      a device case enclosing the plurality of light sources, wherein the device case comprises a plurality of sidewalls having an inner surface configured to reflect light from the plurality of light sources, wherein each sidewall of the device case and the circuit board form an angle in the range of about 60 degrees to less than 90 degrees; and
   at least one light-diffusing plate optically coupled between the plurality of light sources and the display panel, the at least one light-diffusing plate having a light incidence area for receiving light from the plurality of light sources, wherein the light incidence area of the at least one light-diffusing plate is substantially equal to the display area, and the light distribution surface area is greater than the light incidence area.

2. The display device according to claim 1, wherein the display area has a width 'A' and a length 'B';
   each one of the plurality of light sources is separated from adjacent light sources by a pitch 'G'; and
   the light distribution surface area 'S' is confined to the range defined by $(A+G)\times(B+G) \leq S \leq (A+3G)\times(B+3G)$.

3. The display device according to claim 1, wherein the display panel is a liquid crystal display panel.

4. The display device according to claim 1, wherein the plurality of light sources are light-emitting diodes.

5. The display device according to claim 1, wherein the plurality of light sources are distributed in an array.

6. The display device according to claim 1, wherein a portion of at least one of the plurality of sidewalls of the device case is curved.

7. The display device according to claim 1, wherein the inner surface of at least one of the plurality of sidewalls of the device case is configured to scatter light within the device case.

8. A display device comprising:
   a display panel having a display area for displaying images;
   a backlight device coupled to the display panel, including:
      a circuit board;
      a plurality of light sources distributed on the circuit board with a light distribution surface area; and
      a device case enclosing the plurality of light sources, wherein the device case comprises a plurality of sidewalls having an inner surface configured to reflect light from the plurality of light sources, wherein each sidewall of the device case and the circuit board form an angle in the range of about 60 degrees to less than 90 degrees; and
   wherein the light distribution surface area is greater than the display area.

* * * * *